(12) United States Patent
Ozawa et al.

(10) Patent No.: US 9,791,796 B2
(45) Date of Patent: Oct. 17, 2017

(54) POLYESTER RESIN, METHOD FOR PRODUCING SAME, AND TONER

(71) Applicant: Mitsubishi Rayon Co., Ltd., Chiyoda-ku (JP)

(72) Inventors: Tadahiro Ozawa, Toyohashi (JP); Masaru Sugiura, Toyohashi (JP); Ryuichi Ansai, Yokohama (JP); Satoshi Sakuma, Yokohama (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/106,959

(22) PCT Filed: Dec. 24, 2013

(86) PCT No.: PCT/JP2013/084473
§ 371 (c)(1),
(2) Date: Jun. 21, 2016

(87) PCT Pub. No.: WO2015/097746
PCT Pub. Date: Jul. 2, 2015

(65) Prior Publication Data
US 2016/0370723 A1 Dec. 22, 2016

(51) Int. Cl.
*C08G 63/02* (2006.01)
*G03G 9/087* (2006.01)
*C08G 63/668* (2006.01)
*C08G 63/672* (2006.01)

(52) U.S. Cl.
CPC ....... *G03G 9/08755* (2013.01); *C08G 63/668* (2013.01); *C08G 63/672* (2013.01)

(58) Field of Classification Search
CPC ..................................................... G03G 9/087
USPC ........................................................ 528/176
See application file for complete search history.

(56) References Cited

U.S. PATENT DOCUMENTS 4,476,253 A 10/1984 Salzburg et al.

FOREIGN PATENT DOCUMENTS

| CN | 103180785 | 6/2013 |
|---|---|---|
| JP | 2-14016 A | 1/1990 |
| JP | 2001-19749 A | 1/2001 |
| JP | 2005-250443 A | 9/2005 |
| JP | 2007-213043 | 8/2007 |
| JP | 2008-239744 A | 10/2008 |
| JP | 2013-144738 A | 7/2013 |
| JP | 2013-256599 A | 12/2013 |

OTHER PUBLICATIONS

International Search Report Issued Apr. 1, 2014 in PCT/JP13/084473 Filed Dec. 24, 2013.
Office Action dated Dec. 30, 2016 in Chinese Patent Application No. 201380081800.4 (with English machine translation).

*Primary Examiner* — Terressa Boykin
(74) *Attorney, Agent, or Firm* — Oblon, McClelland, Maier & Neustadt, L.L.P.

(57) ABSTRACT

The present invention relates to a polyester resin which comprises a constituent unit represented by general formula (1), a constituent unit derived from a compound having a bisphenol skeleton and a constituent unit derived from a polyvalent carboxylic acid, and wherein the constituent unit derived from a compound having a bisphenol skeleton is contained in an amount of 20 parts by mole or more per 100 parts by mole of the constituent unit derived from a polyvalent carboxylic acid. The present invention is able to provide a polyester resin which has excellent solubility in a solvent and excellent pulverization properties, and which provides a toner having excellent storage stability.

[chemical formula 1]

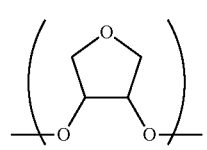

(1)

16 Claims, No Drawings

POLYESTER RESIN, METHOD FOR PRODUCING SAME, AND TONER

TECHNICAL FIELD

The present invention relates to a polyester resin and its production method, and to a toner.

BACKGROUND ART

Polyester resins are used in molding materials, films, adhesives, coating materials, toner binder resins, binder resins for sublimation transfer films, ink binders, modifiers, and the like.

For instance, when polyester resins are used as coating materials and binder resins, it is necessary for the polyester resins to be soluble in the solvent.

In addition, toners need to maintain stable conditions during storage without resulting in agglomeration, and to provide high-resolution images. To provide high-resolution images, toner binder resins need to be pulverized into fine particles.

Moreover, to achieve high-resolution images, chemical methods capable of forming fine particulate toners are drawing attention.

An example of such chemical methods to obtain toner particles is as follows:
a polyester resin and toner additives such as a colorant are dissolved or dispersed in an organic solvent capable of dissolving the polyester resin; the mixture liquid is dispersed in an aqueous medium containing a dispersion stabilizer or the like so that particles are formed; the organic solvent is removed; and the particles are extracted and dried. Thus, polyester resins used for such a chemical method need to be soluble in organic solvents.

Namely, polyester resins suitable for use in both pulverization and chemical methods need to exhibit all the necessary properties, that is, solubility in solvents, pulverization into fine particles, and storage stability of a toner to be produced.

As an example of such polyester resins, Patent Literature 1 describes a method for enhancing the storage stability of a toner by copolymerizing polyethylene terephthalate with erythritane so as to raise the glass transition temperature. Also, Patent Literature 2 describes a polyester resin with enhanced resin pulverization properties obtained by copolymerizing trifunctional monomers.

CITATION LIST

Patent Documents

Patent Document 1: JP2008-239744A
Patent Document 2: JP2005-250443A

DISCLOSURE OF INVENTION

Problems to be Solved by the Invention

However, since the copolymerized polyester resin for molding material disclosed in Patent Literature 1 has a lower solubility in a solvent, it is not suitable for use as a toner material to be produced by a chemical method.

In addition, the method disclosed in Patent Literature 2 raises the softening temperature of the resin but fails to raise the glass transition temperature. Thus, the obtained toner tends to have insufficient storage stability.

The objective of the present invention is to provide a polyester resin, which exhibits properties such as solubility in a solvent, pulverization into fine particles and storage stability of a toner to be obtained, along with a production method thereof, and to provide a toner produced from such a polyester resin.

Means to Solve the Problems

The present invention is described as follows:

<1> A polyester resin, containing a structural unit represented by general formula (1) below, a structural unit derived from a compound having a bisphenol skeleton, and a structural unit derived from polycarboxylic acid, in which the structural unit derived from a compound having a bisphenol skeleton is contained at 20 molar parts or greater relative to 100 molar parts of the structural unit derived from polycarboxylic acid;

[chemical formula 1]

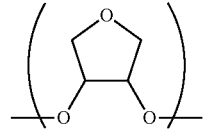

(1)

<2> The polyester resin described in <1>, in which the structural unit derived from a compound having a bisphenol skeleton is derived from bisphenol A propylene oxide adduct;

<3> The polyester resin described in <1>, in which the structural unit represented by general formula (1) is contained at 5~75 molar parts relative to 100 molar parts of the structural unit derived from polycarboxylic acid;

<4> The polyester resin described in <1>, containing a structural unit derived from a monomer having at least three functional groups, in which the structural unit derived from a monomer having at least three functional groups is contained at 1~30 molar parts relative to 100 molar parts of the structural unit derived from polycarboxylic acid;

<5> The polyester resin described in <4>, in which the structural unit derived from a monomer having at least three functional groups is derived from trimellitic acid or its anhydride;

<6> The polyester resin described in <1>, having a glass transition temperature (Tg) of 45° C.~100° C.;

<7> The polyester resin described in <1>, having a peak molecular weight (Mp) of 500~50,000 measured by gel permeation chromatography (GPC);

<8> The polyester resin described in <1>, having a softening temperature of 100° C.~160° C.;

<9> A method for producing the polyester resin described in <1>, including a step for polycondensing a monomer mixture containing polyalcohol represented by general formula (2) below, a compound having a bisphenol skeleton, and polycarboxylic acid, in which the content of the compound having a bisphenol skeleton in the monomer mixture is 20 molar parts or greater relative to 100 molar parts of the polycarboxylic acid;

[chemical formula 2]

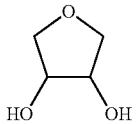

(2)

<10> The method for producing a polyester resin described in <9>, in which the compound having a bisphenol skeleton is bisphenol A propylene oxide adduct;
<11> The method for producing a polyester resin described in <9>, in which the content of polyalcohol represented by general formula (2) in the monomer mixture is at 15~75 molar parts relative to 100 molar parts of the polycarboxylic acid;
<12> The method for producing a polyester resin described in <9>, in which the monomer mixture includes a monomer having at least three functional groups, and the content of the monomer having at least three functional groups in the monomer mixture is 1~30 molar parts relative to 100 molar parts of the polycarboxylic acid;
<13> The method for producing a polyester resin described in <9>, in which the monomer having at least three functional groups is trimellitic acid or its anhydride;
<14> The method for producing a polyester resin described in <9>, in which the temperature for polycondensing the monomer mixture is 180° C.~280° C.;
<15> The method for producing a polyester resin described in <9>, in which the monomer mixture contains a release agent;
<16> A toner containing the polyester resin described in any of <1>~<8>;
<17> A polyester resin, containing a structural unit derived from polyalcohol and a structural unit derived from polycarboxylic acid, in which the structural unit derived from polyalcohol includes a structural unit represented by general formula (1) above and a structural unit derived from a compound having a bisphenol skeleton, while the content of the structural unit derived from a compound having a bisphenol skeleton in the polyester resin is 20 molar parts or greater relative to 100 molar parts of the structural unit derived from the polycarboxylic acid; and
<18> A method for producing the polyester resin described in <17>, including a step for polycondensing a monomer mixture made up of polycarboxylic acid and of polyalcohol containing a compound represented by general formula (2) above as well as a compound having a bisphenol skeleton, in which the content of a compound having a bisphenol skeleton in the monomer mixture is 20 molar parts or greater relative to 100 molar parts of the polycarboxylic acid.

Effects of the Invention

According to the embodiments of the present invention, polyester resins are obtained to exhibit excellent properties such as solubility in a solvent, pulverization into fine particles, and storage stability for a toner to be produced.

EMBODIMENTS FOR CARRYING OUT THE INVENTION

The present invention is described in detail below.
[Polyester Resin]
A polyester resin related to the present invention contains a structural unit represented by general formula (1) below, a structural unit derived from a compound having a bisphenol skeleton, and a structural unit derived from polycarboxylic acid, in which the structural unit derived from a compound having a bisphenol skeleton is contained at 20 molar parts or greater relative to 100 molar parts of the structural unit derived from polycarboxylic acid.

An aspect of the present invention is a polyester resin that contains a structural unit derived from polyalcohol and a structural unit derived from polycarboxylic acid, in which the structural unit derived from polyalcohol includes a structural unit represented by general formula (1) below and a structural unit derived from a compound having a bisphenol skeleton, while the content of the structural unit derived from a compound having a bisphenol skeleton in the polyester resin is 20 molar parts or greater relative to 100 molar parts of the structural unit derived from polycarboxylic acid.

[chemical formula 3]

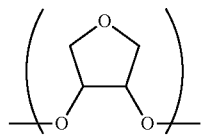

(1)

(Structural Unit Represented by General Formula (1))

In the embodiments of the present invention, a polyester resin having a structural unit represented by general formula (1) above is obtained by polycondensing a monomer mixture that contains polyalcohol represented by general formula (2) below (hereinafter may also be referred to as "erythritane"), a polyalcohol component including a compound having a bisphenol skeleton, and polycarboxylic acid. Erythritane is synthesized through, for example, intramolecular dehydration reactions of erythritol, which is a natural polysaccharide.

Namely, in the present invention, the structural unit represented by general formula (1) below is derived from polyalcohol (erythritane) represented by general formula (2) below.

[chemical formula 4]

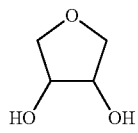

(2)

In the polyester resin related to the present invention, the content of a structural unit represented by general formula (1) above is preferred to be 15~75 molar parts, more preferably 30~70 molar parts, relative to 100 molar parts of the structural unit derived from polycarboxylic acid. Regarding the content of a structural unit represented by general formula (1) above relative to 100 molar parts of the structural unit derived from polycarboxylic acid, it is preferred to be 15 molar parts or greater, because such a setting is likely to enhance the storage stability of a toner containing the polyester resin related to the present invention, whereas the content is preferred to be 75 molar parts or less, because the solubility of polyester resin in a solvent is more likely to be enhanced.

Moreover, to achieve both the solubility of the polyester resin in a solvent and storage stability of the toner, the content of a structural unit represented by general formula (1) is preferred to be 30~70 molar parts relative to 100 molar parts of the structural unit derived from polycarboxylic acid.

Here, to set the content of a structural unit represented by general formula (1) to be 15~75 molar parts in a polyester resin relative to 100 molar parts of the structural unit derived from polycarboxylic acid, the content of polyalcohol represented by general formula (2) is set to be 15~75 molar parts relative to 100 molar parts of the polycarboxylic acid in the monomer mixture when producing the polyester resin by a method related to the present invention that includes a step for polycondensing a monomer mixture containing polyalcohol represented by general formula (2), a compound having a bisphenol skeleton, and polycarboxylic acid.

In the present application, "polyalcohol" refers to a compound having at least two hydroxyl groups in the molecule. Also, "polycarboxylic acid" refers to a compound having at least two carboxyl groups in the molecule (including acid anhydrides and ester compounds).

The content of a structural unit represented by general formula (1) in a polyester resin related to the present invention is determined through the spectrum analysis of $^1$H-NMR (nuclear magnetic resonance spectroscopy) and $^{13}$C-NMR, by calculating the integrated intensity ratio of a signal in the spectrum derived from each raw material monomer in the copolymer relative to the integrated intensity of the signal in the spectrum of terephthalic acid based on the spectrum of trimethylsilane. Especially, by using two types of nuclei probes, highly accurate analysis is carried out. Assignment of each absorption peak in the NMR spectrum is determined based on the content described in special edition No. 141, "Kagaku no Ryoiki" (Domain of Chemistry), Elements of NMR and Experiment Guide [I], pages 132-133.

(Structural Unit Derived from Compound Having Bisphenol Skeleton)

In addition, a polyester resin related to the present invention needs to contain a structural unit derived from a compound having a bisphenol skeleton at 20 molar parts or greater relative to 100 molar parts of the structural unit derived from polycarboxylic acid. By containing at least 20 molar parts of the structural unit derived from a compound having a bisphenol skeleton relative to 100 molar parts of the structural unit derived from polycarboxylic acid, solubility of the polyester resin is enhanced in aromatic solvents such as toluene and xylene.

To achieve both the solubility of the polyester resin in a solvent and storage stability of a toner to be produced, the content of a structural unit derived from a compound having a bisphenol skeleton is preferred to be 30~70 molar parts, more preferably 35~70 molar parts.

To set the content of a structural unit derived from a compound having a bisphenol skeleton in a polyester resin at a preferred range described above, the content of a compound having a bisphenol skeleton in the monomer mixture needs to be 20 molar parts or greater relative to 100 molar parts of the polycarboxylic acid.

The content of the structural unit derived from a compound having a bisphenol skeleton in a polyester resin related to the present invention is determined through the analysis of $^1$H-NMR and $^{13}$C-NMR spectra the same as that conducted on the content of a structural unit represented by general formula (1) above.

In an embodiment of the present invention, a compound having a bisphenol skeleton refers to a compound having two hydroxyphenyl groups in the molecule.

Examples of a compound having a bisphenol skeleton are bisphenol A-propylene oxide adducts, ethylene oxide-propylene oxide adducts, bisphenol Z-ethylene oxide adducts, bisphenol Z-propylene oxide adducts, bisphenol S-ethylene oxide adducts, bisphenol S-propylene oxide adducts, bisphenol propylene oxide adducts, bisphenol F-ethylene oxide adducts, bisphenol F-propylene oxide adducts, bisphenol E-ethylene oxide adducts, bisphenol E-propylene oxide adducts, bisphenol C-ethylene oxide adducts, bisphenol C-propylene oxide adducts, bisphenol M-ethylene oxide adducts, bisphenol M-propylene oxide adducts, bisphenol P-ethylene oxide adducts, bisphenol P-propylene oxide adducts, and the like. Among bisphenol A derivatives, bisphenol A-propylene oxide adducts are especially preferred; for example, polyoxypropylene-(2.0)-2,2-bis(4-hydroxyphenyl)propane, polyoxypropylene (6)-2,2-bis(4-hydroxyphenyl)propane, polyoxypropylene (2.3)-2,2-bis(4-hydroxyphenyl)propane, polyoxypropylene (3.3)-2,2-bis(4-hydroxyphenyl)propane, and the like. Moreover, bisphenol A-propylene oxide adducts are preferred, because solubility of polyester resin in a solvent is enhanced.

Also, in an embodiment of the present invention, the amount of propylene oxide to be added to bisphenol A is preferred to be 1.5~10 mol, more preferably 2~5 mol, relative to 1 mol of bisphenol A.

(Structural Unit Derived from Polycarboxylic Acid)

In addition to a structural unit represented by general formula (1) above and a structural unit derived from a compound having a bisphenol skeleton, a polyester resin related to the present invention contains a structural unit derived from polycarboxylic acid. As for such a structural unit derived from polycarboxylic acid, a structural unit derived from dicarboxylic acid is preferred.

Examples of a structural unit derived from dicarboxylic acid are terephthalic acid, isophthalic acid, isomers of naphthalenedicarboxylic acid (for example, 1,4-naphthalenedicarboxylic acid, 1,5-naphthalene dicarboxylic acid, 1,6-naphthalene dicarboxylic acid, 1,7-naphthalene dicarboxylic acid, 2,5-naphthalenedicarboxylic acid, 2,6-naphthalenedicarboxylic acid, 2,7-naphthalenedicarboxylic acid, 2,8-naphthalenedicarboxylic acid, etc.), or their lower alkyl esters, and the like. Examples of lower alkyl esters of terephthalic acid and isophthalic acid are dimethyl terephthalate, dimethyl isophthalate, diethyl terephthalate, diethyl isophthalate, dibutyl terephthalate, dibutyl isophthalate, succinic acid, sebacic acid, isodecyl succinic acid, dodecenylsuccinic acid, octadecenyl succinic acid, maleic acid and adipic acid, or their monomethyl, monoethyl, dimethyl, and diethyl esters or their anhydrides; fumaric acid, maleic acid, maleic anhydride, citraconic acid, itaconic acid and tetrahydrophthalic phthalic acid, or their ester derivatives; acrylic acid, crotonic acid and methacrylic acid, or their ester derivatives; and the like. Among those listed above, terephthalic acid and isophthalic acid are preferred considering toner storage stability, ease of handling, and cost. Those dicarboxylic acids and their lower alkyl esters may be used alone or in combination thereof.

In a polyester resin related to the present invention, the content of a structural unit derived from dicarboxylic acid is preferred to be 70~100 molar parts, more preferably 75~100 molar parts, relative to 100 molar parts of polycarboxylic acid.

(Structural Unit Derived from Monomer Having at Least Three Functional Groups)

In an embodiment of the present invention, a polyester resin is preferred to contain 1~30 molar parts of a structural unit derived from a monomer having at least three functional groups relative to 100 molar parts of the structural unit derived from polycarboxylic acid.

Regarding the content of a structural unit derived from a monomer having at least three functional groups relative to 100 molar parts of the structural unit derived from polycarboxylic acid, it is preferred to be 1 molar part or greater because the storage stability of the toner is more likely to be enhanced, whereas a content of 30 molar parts or less is preferred because solubility of the polyester resin in a solvent is more likely to be improved.

To achieve both excellent storage stability of a toner and solubility of the polyester resin in a solvent, the content of a structural unit derived from a monomer having at least three functional groups is preferred to be 2~28 molar parts relative to 100 molar parts of the structural unit derived from polycarboxylic acid. Namely, the content of the structural unit derived from a monomer having at least three functional groups is preferred to be 1~30 molar parts, more preferably 2~28 molar parts, relative to 100 molar parts of the structural unit derived from polycarboxylic acid.

To set the content of the structural unit derived from a monomer having at least three functional groups in a polyester resin at a preferred range described above, the content of a monomer having at least three functional groups in the monomer mixture is set to be 1~30 molar parts relative to 100 molar parts of polycarboxylic acid.

The content of the structural unit derived from a monomer having at least three functional groups in a polyester resin related to the present invention is determined through $^1$H-NMR and $^{13}$C-NMR spectrum analysis the same as that conducted on the content of a structural unit represented by general formula (1) above.

In an embodiment of the present invention, a monomer having at least three functional groups is preferred to be at least one monomer selected from among trivalent or higher polycarboxylic acids and trivalent or higher polyalcohols listed below.

In the present application, "trivalent or higher polycarboxylic acid" refers to a carboxylic acid having at least three carboxylic groups in the molecule, its anhydride or its ester. Likewise, "trivalent or higher polyalcohol" refers to an alcohol having at least three hydroxyl groups in the molecule.

Examples of trivalent or higher polycarboxylic acid are trimellitic acid, pyromellitic acid, 1,2,4-cyclohexane tricarboxylic acid, 2,5,7-naphthalene tricarboxylic acid, 1,2,4-naphthalene tricarboxylic acid, 1,2,5-hexane tricarboxylic acid and 1,2,7,8-octane tetracarboxylic acid, and their anhydrides. Also, esters of trivalent or higher polycarboxylic acids are, for example, lower alkyl esters having 1~6 carbon atoms in the alkyl group. Among them, considering the ease of handling and cost, trimellitic acid or its anhydride are preferable.

Examples of trivalent or higher polyalcohol are sorbitol, 1,2,3,6-hexa tetralol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylol propane, glycerine, 1,3,5-trihydroxy methyl benzene, and the like. Considering the ease of handling and cost, pentaerythritol, trimethylolpropane or glycerin are preferred. They may be used alone or in combination thereof.

It is preferred that at least a monomer selected from among trivalent or higher polycarboxylic acids and trivalent or higher polyalcohols listed above be contained in the monomer mixture at 1~30 molar parts relative to 100 molar parts of polycarboxylic acid, because crosslinking occurs in the polyester resin, thus enhancing durability and improving the solubility of the polyester resin in a solvent. In addition, the storage stability of a toner to be obtained is enhanced.

(Other Structural Units)

In an embodiment of the present invention, a polyester resin may further contain any structural unit other than the structural units described above; for example, polycarboxylic acids that exclude the aforementioned dicarboxylic acids and trivalent or higher polycarboxylic acids, polyalcohols that exclude the aforementioned trivalent or higher polyalcohols, and so forth. For the polyester resin of the present invention to include an optional structural unit, the aforementioned component may be combined with the monomer unit.

Other than the aforementioned structural units, examples of polyalcohol to be contained in the monomer mixture are diols such as ethylene glycol, neopentyl glycol, propylene glycol, hexanediol, polyethylene glycol, 1,3-propanediol, 1,4-butanediol, diethylene glycol, triethylene glycol, dipropylene glycol, tripropylene glycol, 1,4-cyclohexanedimethanol, D-isosorbide, L-isosorbide, isomannide, 1,4-dihydroxy-2-butene, polyoxyethylene-(2.0)-2,2-bis(4-hydroxyphenyl)propane, polyoxypropylene-(2.0)-2,2-bis(4-hydroxyphenyl)propane, polyoxypropylene-(2.3)-2,2-bis(4-hydroxyphenyl)propane, polyoxypropylene (2.2)-polyoxyethylene-(2.0)-2,2-bis(4-hydroxyphenyl)propane, polyoxypropylene (6)-2,2-bis(4-hydroxyphenyl)propane, polyoxypropylene (2.2)-2,2-bis(4-hydroxyphenyl)propane, polyoxypropylene-(2.4)-2,2-bis(4-hydroxyphenyl)propane, and polyoxypropylene (3.3)-2,2-bis(4-hydroxyphenyl)propane. These diol components may be used alone or in combination thereof. Among them, considering properties of the polyester resin such as solubility in a solvent and pulverization into fine particles, along with storage stability of a toner to be produced, it is preferred to use at least one selected from among ethylene glycol, polyoxyethylene-(2.0)-2,2-bis(4-hydroxyphenyl)propane, polyoxypropylene-(2.0)-2,2-bis(4-hydroxyphenyl)propane, and polyoxypropylene-(2.3)-2,2-bis(4-hydroxyphenyl)propane.

Furthermore, a polyester resin related to the present invention may contain a structural unit derived from monocarboxylic acid or monoalcohol.

Examples of monocarboxylic acid are aromatic carboxylic acids having 30 or fewer carbon atoms such as benzoic acid and p-methylbenzoic acid; aliphatic carboxylic acids having 30 or fewer carbon atoms such as stearic acid and behenic acid; unsaturated carboxylic acids having one or more unsaturated double bonds in the molecule such as cinnamic acid, oleic acid, linoleic acid, and linolenic acid.

Examples of monoalcohol are aromatic alcohols having 30 or fewer carbon atoms such as benzyl alcohol; and aliphatic alcohols having 30 or fewer carbon atoms such as oleyl alcohol, lauryl alcohol, cetyl alcohol, stearyl alcohol and behenyl alcohol.

When a polyester resin contains a structural unit derived from such a monocarboxylic acid or monoalcohol, the content is preferred to be 0.1~20 molar parts relative to 100 molar parts of the polycarboxylic acid.

A polyester resin related to the present invention may further contain unsaturated double bonds in the molecule. The site of unsaturated double bonds may be on the main chain or side chain of the polyester resin.

Here, "main chain of a polyester resin" refers to the primary carbon chain of a polyester resin; in the present application, it indicates the stem structure that includes ester bonds and has the maximum number of carbon atoms. In addition, side chains refer to portions other than the main chain.

When unsaturated double bonds are included in the molecule of polyester resin, crosslinking reactions of unsaturated double bonds occur between chains of molecules, resulting in a polyester resin with a wider distribution of molecular weights. Using such a polyester resin as raw material of a toner is preferred since the low-temperature adhesion range of a toner is more likely to be wider.

Here, unsaturated double bonds indicate carbon-carbon double bonds. To obtain a polyester resin having unsaturated double bonds in the molecule, it is preferred to prepare a monomer mixture by adding at least one type selected from among polycarboxylic acids having unsaturated double bonds and polyalcohols having unsaturated double bonds, and then to polycondense the monomer mixture.

To include polycarboxylic acid having unsaturated double bonds, the content is preferred to be 1~50 molar parts, more preferably 5~30 molar parts, relative to 100 molar parts of the polycarboxylic acid in the monomer mixture. In addition, to include polyalcohol having unsaturated double bonds, the content in the monomer mixture is preferred to be 1~50 molar parts, more preferably 5~30 molar parts, relative to 100 molar parts of the polycarboxylic acid. Moreover, to include both polycarboxylic acid and polyalcohol having unsaturated double bonds, their total content in the monomer mixture is preferred to be adjusted to be 1~50 molar parts relative to 100 molar parts of the polycarboxylic acid.

Regarding the content of a monomer having unsaturated double bonds relative to 100 molar parts of the polycarboxylic acid in the monomer mixture, it is preferred to be at least 1 molar part, because the low-temperature adhesion range of the toner is more likely to be wider, while it is preferred to be 50 molar parts or less because excellent storage stability of the toner is more likely to be achieved. Considering the pulverization property of the polyester resin, the content is preferred to be 5~30 molar parts.

Examples of polycarboxylic acid having unsaturated double bonds are fumaric acid, maleic acid, maleic anhydride, citraconic acid, itaconic acid and tetrahydrophthalic acid, or their ester derivatives; acrylic acid, crotonic acid and methacrylic acid, or their ester derivatives; and so forth. In addition, an example of polyalcohol having unsaturated double bonds is 1,4-dihydroxy-2-butene. Among those, fumaric acid, maleic acid and maleic anhydride are preferred in view of reactivity.

In an embodiment of the present invention, glass transition temperature (Tg) of the polyester resin is preferred to be 45° C. to 100° C., considering the storage stability of the toner and the pulverization property of the polyester resin. The glass transition temperature is more preferred to be 80° C. to 100° C.

Glass transition temperature is measured by using a differential scanning calorimeter and is obtained as the value at the intersection of the baseline and the tangent of endothermic curve in a chart prepared by setting the rate of temperature rise at 5° C./min.

In addition, in an embodiment of the present invention, the softening temperature of a polyester resin is preferred to be 100° C. to 160° C. A softening temperature of at least 100° C. is preferred, since the storage stability of the toner is enhanced, whereas a softening temperature of 160° C. or lower is preferred since solubility in a solvent and pulverization of the polyester resin are improved.

A softening temperature is measured when a 4 mm-long amount is flowed out of a 1.0 gram sample through a 1 mmϕ×10 mm nozzle under conditions of a load at 294 N (30 Kgf) and a programmed constant temperature rise of 3° C./min.

In an embodiment of the present invention, the acid value of a polyester resin is preferred to be 50 mg KOH/g or lower, more preferably 40 mg KOH/g or lower. By setting the acid value of a polyester resin at 40 mg KOH/g or lower, the moisture absorption of the toner and toner resin is suppressed from increasing. In addition, the lower limit of the acid value of a polyester resin is preferred to be at least 1 mg KOH/g from the viewpoint of enhancing electrostatic properties of the toner. Namely, in an embodiment of the present invention, the acid value of a polyester resin is preferred to be 1~50 mg KOH/g, more preferably 1~40 mg KOH/g.

The acid value of a polyester resin is measured by dissolving 0.2 grams of polyester resin in benzyl alcohol, and by titrating 0.02N of a KOH benzyl alcohol solution using cresol red as an indicator.

In an embodiment of the present invention, the value of peak molecular weight (Mp) of polyester resin measured by gel permeation chromatography (hereinafter referred to as "GPC") is preferred to be 500~50,000, more preferably 1,000~30,000. An Mp value of 500 or greater is preferred, since the storage stability of the toner is excellent, and an Mp value of 50,000 or less is preferred, since the pulverization property of the polyester resin is enhanced.

Here, the peak molecular weight (Mp) refers to the molecular weight at the highest peak in a molecular weight distribution obtained through GPC. In addition, the peak molecular weight is the value measured in terms of standard polystyrene.

[Method for Producing Polyester Resin]

Next, a method is described for producing polyester resin according to an embodiment of the present invention.

The polyester resin related to the present invention is produced by polycondensing a monomer mixture that contains polyalcohol represented by general formula (2), a compound having a bisphenol skeleton, and polycarboxylic acid.

Namely, an aspect of the present invention is a method for producing polyester resin; the method includes a step for polycondensing a monomer mixture containing polyalcohol and polycarboxylic acid. The polyalcohol contains a compound represented by general formula (2) and a compound having a bisphenol skeleton, and the content of the compound having a bisphenol skeleton is set to be at least 20 molar parts relative to 100 molar parts of the polycarboxylic acid in the monomer mixture.

[chemical formula 5]

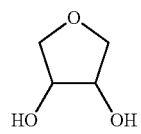

(2)

(Monomer Mixture)

In an embodiment of the present invention, the content of polyalcohol (erythritane) represented by general formula (2) above in the monomer mixture is preferred to be 15~75 molar parts, more preferably 30~70 molar parts, relative to 100 molar parts of the polycarboxylic acid. When the content of polyalcohol represented by general formula (2) is 15 molar parts or greater, the storage stability of the toner is more likely to be enhanced, whereas a content of 75 molar parts or less is more likely to improve the solubility of the polyester resin in a solvent.

Moreover, to achieve both solubility of the polyester resin in a solvent and storage stability of the toner, the content of polyalcohol represented by general formula (2) above in the monomer mixture is preferred to be 30~70 molar parts relative to 100 molar parts of the polycarboxylic acid.

In addition, a polyester resin related to the present invention contains at least 20 molar parts of a compound having a bisphenol skeleton relative to 100 molar parts of the polycarboxylic acid in the monomer mixture. Examples of a compound having a bisphenol skeleton are those listed earlier. Among them, bisphenol A-propylene oxide adducts are especially preferred.

The content of a compound having a bisphenol skeleton in a monomer mixture is preferred to be 30~70 molar parts, more preferably 35~70 molar parts, relative to 100 molar parts of the polycarboxylic acid in the monomer mixture.

In an embodiment of the present invention, the monomer mixture is preferred to include a monomer that contains at least three functional groups. The content of the monomer having at least three functional groups is preferred to be 1~30 molar parts, more preferably 2~28 molar parts, relative to 100 molar parts of the polycarboxylic acid in the monomer mixture.

Relative to 100 molar parts of the polycarboxylic acid in the monomer mixture, the content of a monomer having at least three functional groups is preferred to be one molar part or greater because the storage stability of the toner is more likely to be enhanced, while the content is preferred to be 30 molar parts or less, because solubility of the polyester resin obtained by the present production method is more likely to improve in a solvent.

At least one monomer selected from among the trivalent or higher polycarboxylic acids and trivalent or higher polyalcohols listed above may be used as a monomer having at least three functional groups. Among them, trimellitic acid or its anhydride is preferred considering the cost and ease of handling the material.

In an embodiment of the present invention, polycarboxylic acid is preferred to include dicarboxylic acid listed above. When the polycarboxylic acid includes dicarboxylic acid, the content is preferred to be 70~100 molar parts, more preferably 75~100 molar parts, relative to 100 molar parts of the polycarboxylic acid.

In an embodiment of the present invention, it is an option for a monomer mixture to contain monocarboxylic acid or monoalcohol.

Also, in an embodiment of the present invention, to balance the glass transition temperature (Tg) and softening temperature (T4) of the polyester resin, the content of polyalcohol in the monomer mixture is preferred to be 70~150 molar parts, more preferably 80~140 molar parts, relative to 100 molar parts of polycarboxylic acid.

To polycondense the monomer mixture, any known method is employed. In particular, monomers are polycondensed in the presence of a polymerization catalyst under a polymerization temperature of 180~280° C.

A polycondensation temperature of 180~280° C. is preferred, since at such a temperature, productivity is excellent, while decomposition of polyester resin and production of byproducts such as odor-causing volatile components are suppressed. A polycondensation temperature of 200~270° C. is more preferred.

In an embodiment of the present invention, time for polycondensing a monomer mixture may be set appropriately so that the produced polyester resin will have the aforementioned preferred glass transition temperature, softening temperature, and peak-top molecular weight.

Examples of a polymerization catalyst are at least one titanium compound selected from among titanium alkoxide compounds having an alkoxy group, titanium carboxylate compounds, titanyl carboxylate compounds, titanyl carboxylate salt compounds, and titanium chelate compounds. Examples of a titanium alkoxide compound having an alkoxy group are titanium tetramethoxide, titanium tetraethoxide, titanium tetrapropoxide, titanium tetrabutoxide, titanium tetrapentoxide, titanium tetraoctoxide, and the like.

Examples of a titanium carboxylate compound are titanium formate, titanium acetate, titanium propionate, titanium octoate, titanium oxalate, titanium succinate, titanium maleate, titanium adipate, titanium sebacate, titanium hexanetricarboxylate, titanium isooctanetricarboxylate, titanium octanetetracarboxylate, titanium decanetetracarboxylate, titanium benzoate, titanium phthalate, titanium terephthalate, titanium isophthalate, titanium 1,3-naphthalenedicarboxylate, titanium 4,4-biphenyldicarboxylate, titanium 2,5-toluenedicarboxylate, titanium anthracenedicarboxylate, titanium trimellitate, titanium 2,4,6-naphthalenetricarboxylate, titanium pyromellitate, titanium 2,3,4,6-naphthalenetetracarboxylate, and the like.

Examples of a titanyl carboxylate compound are titanyl benzoate, titanyl phthalate, titanyl terephthalate, titanyl isophthalate, titanyl 1,3-naphthalenedicarboxylate, titanyl 4,4-biphenyl dicarboxylate, titanyl 2,5-toluene dicarboxylate, titanyl anthracenedicarboxylate, titanyl trimellitate, titanyl 2,4,6-naphthalenetricarboxylate, titanyl pyromellitate, titanyl 2,3,4,6-naphthalenetetracarboxylate, and the like.

Examples of a titanyl carboxylate salt compound are titanium-based catalysts such as alkali metal (lithium, sodium, potassium, etc.) salts or alkaline earth metal (magnesium, calcium, barium, etc.) salts of the above titanyl carboxylates; tin-based catalysts such as dibutyltin oxide, tin acetate, and tin disulfide; zinc acetate, antimony trioxide, germanium dioxide and the like. Among those, titanium-based catalysts are preferred from the viewpoint of reducing environmental impact.

Among the polymerization catalysts, from the viewpoint of solubility in a solvent, tetrabutoxytitanium or tetrapropoxytitanium is more preferred.

In the embodiments of the present invention, a release agent may be added when polymerizing a polyester resin. By adding a release agent during polymerization, the adhesion properties of a toner are enhanced and a wax is dispersed well in the toner.

As for a release agent, the same types of wax to be combined into a later-described toner may be used. Examples are carnauba wax, rice wax, beeswax, synthetic ester wax, paraffin wax, various polyolefin waxes or modified products thereof, fatty acid amides, silicone-based wax, and the like.

In addition, in order to achieve polymerization stability of the polyester resin, stabilizers may be added. Examples of a stabilizer are hydroquinone, methyl hydroquinone, and hindered phenol compounds and the like.

[Toner]

The following are descriptions of a toner produced by using a polyester resin related to the present invention.

An aspect of the present invention is to use the following polyester resin related to the present invention as raw material for forming a toner, or to provide a production method of a toner using the following polyester resin:
a polyester resin, containing a structural unit represented by general formula (1) above, a structural unit derived from a compound having a bisphenol skeleton, and a structural unit derived from polycarboxylic acid, in which the structural unit derived from a compound having a bisphenol skeleton is contained at 20 molar parts or greater relative to 100 molar parts of the structural unit derived from polycarboxylic acid.

Also, another aspect of the present invention is to use the following polyester resin related to the present invention as the raw material for forming a toner, or to provide a production method of a toner using the following polyester resin:
a polyester resin, containing a structural unit derived from polyalcohol and a structural unit derived from polycarboxylic acid, in which the structural unit derived from polyalcohol includes a structural unit represented by general formula (1) above and a structural unit derived from a compound having a bisphenol skeleton, while the content of the structural unit derived from a compound having a bisphenol skeleton in the polyester resin is at least 20 molar parts relative to 100 molar parts of the structural unit derived from polycarboxylic acid.

A toner related to the present invention is obtained by combining a polyester resin described above with additives, if applicable, such as a colorant, charge control agent, release agent, flow modifier, magnetic substance, and a binder resin other than the polyester resin related to the present invention.

Examples of a colorant are carbon black, nigrosine, aniline blue, phthalocyanine blue, phthalocyanine green, Hansa yellow, Rhodamine pigment dyes, chrome yellow, quinacridone, benzidine yellow, rose bengal, triarylmethane dyes, monoazo, disazo, and condensed azo-based dyes or pigments. These dyes and pigments may be used alone or in combination thereof. In the case of a full-color toner, benzidine yellow, monoazo dyes and pigments, condensed azo dyes and pigments and the like as yellow; quinacridone, Rhodamine pigment dyes, monoazo dyes and pigments and the like as magenta; phthalocyanine blue and the like as cyan are used. The content of the colorant is not limited specifically, but it is preferred to be 2~10 mass % of the total weight of the toner, considering the color tone, image density, and thermal characteristics of the toner.

Examples of a charge control agent are quaternary ammonium salts, basic or electron-donating organic substances or the like may be used as a positive charge control agent, whereas metal chelates, metal-containing dyes, or acidic or electron-withdrawing organic substances or the like are used as a negative charge control agent. For color toners, it is important for a charge control agent to be colorless or pale so as not to affect color tones of the toner. Examples are salts and complexes of salicylic acid or alkyl salicylic acid with metals such as chromium, zinc and aluminum, amide compounds, phenol compounds, naphthol compounds and the like. Furthermore, styrene-, acrylic acid-, and methacrylic acid-based vinyl polymers or vinyl polymers having sulfonic acid groups may also be used as charge control agents.

The content of a charge control agent is preferred to be 0.5~5 mass % of the total weight of the toner. When the content is 0.5 mass % or greater, a sufficient level of electric charge of the toner is more likely to be obtained, whereas a content of 5 mass % or less may suppress a reduction of electric charge caused by an agglomerated charge control agent.

Considering release, preservation, adhesion and coloring properties of a toner, a release agent may be selected from among carnauba wax, rice wax, beeswax, polypropylene-based wax, polyethylene-based wax, synthetic ester-based wax, paraffin wax, fatty acid amides, silicone-based wax and the like. They may be used alone or in combination thereof. The melting point of a release agent may be appropriately selected considering the characteristics of the above toner.

The content of a release agent is not limited specifically as long as the effects of the present invention are achieved, but it is preferred to be 0.3~15 mass %, more preferably 1~13 mass %, especially preferably 2~12 mass % of the total mass of the toner, since the content affects the aforementioned toner properties.

Examples of flow modifiers as additives are flow enhancers such as fine powders of silica, alumina and titania; resistance adjusters such as inorganic fine powders of magnetite, ferrite, cerium oxide, strontium titanate and conductive titania, as well as styrene resin and acrylic resin; and lubricants. Those listed above may be used as internal or external additives.

The content of those additives is preferred to be 0.05~10 mass % of the total mass of the toner. When the content of those additives is 0.05 mass % or greater, performance modification effects of the toner are more likely to be achieved sufficiently, whereas a content of 10 mass % or less is more likely to achieve excellent image stability.

In addition, within a range not to impair the effects of the present invention, a resin other than the polyester resins of the present invention may be used as a binder resin. Examples are resins having physical properties in a range different from those specified above, such as polyester resins, styrene resins, styrene-acrylic resins, cyclic olefin resins, methacrylic acid-based resins and epoxy resins. Those resins may be used alone or in combination thereof.

The toner related to the present invention may also be used as a magnetic one-component developer, a non-magnetic one-component developer or a two-component developer.

When used as a magnetic one-component developer, a magnetic material is contained. Examples of a magnetic material are ferromagnetic alloys such as ferrite, magnetite, iron, cobalt and nickel; compounds and alloys that do not contain ferromagnetic elements but become ferromagnetic when appropriately treated by applying heat, for example, chromium dioxides, so-called Heusler alloys containing manganese and copper such as manganese-copper-aluminum and manganese-copper-tin, and the like.

The content of magnetic material is not limited specifically, but is preferred to be 3~70 mass %, more preferably 3~60 mass %, even more preferably 3~50 mass %, of the entire mass of the toner because a magnetic substance significantly affects the pulverization property of the toner. When the content of magnetic material is 3 mass % or greater, the level of electric charge of the toner is more likely to be sufficient. When the content is 70 mass % or less, excellent adhesion and pulverization properties of the toner are more likely to be achieved.

In addition, when the toner is used as a two-component developer, it is used in combination with a carrier. Examples of a carrier are magnetic powders such as iron powder, magnetite powder and ferrite powder, carriers obtained by resin-coating those powders, and magnetic carriers. Coating resins for forming resin-coated carriers are, for example, styrene resins, acrylic resins, styrene-acrylic copolymer resins, silicone resins, modified silicone resins, fluorine resins, and mixtures of those resins.

A toner containing a polyester resin related to the present invention is produced by a known method.

For example, when a toner is produced by a pulverization method, the following steps are employed: a binder resin that contains a polyester resin related to the present invention and other mixing materials are measured, and the materials are combined using a blender to obtain a mixture. Examples of a blender are a Henschel mixer, super mixer, V-type blender and Nauta mixer.

The mixture is then fed to a kneader and melt-kneaded therein. Examples of a kneader are extrusion kneaders such as a twin-screw extrusion kneader and a single-screw extrusion kneader; open-roll kneaders such as a continuous two-roll mill, continuous three-roll mill and batch-type roll mill; and the like.

The melt-kneaded mixture discharged from the kneader is usually cooled and pulverized according to a method for producing a toner.

When a chemical method is employed, a toner is produced by methods such as an emulsion polymerization and aggregation method, suspension polymerization method, melt-suspension method, and ester elongation polymerization method.

In particular, a polyester resin related to the present invention and other mixing materials are dispersed in an aqueous medium. Then, particles are formed in the aqueous medium, extracted and dried. Accordingly, toner particles are obtained. If applicable, an external additive, for example, inorganic particles or the like, is added to the particle surfaces.

The particle diameter of a toner that contains a polyester resin related to the present invention is not limited specifically as long as the effects of the present invention are achieved. It is preferred to be in a range of 3~15 μm, more preferably, 5~10 μm. A toner particle diameter of 3 μm or greater is preferred since excellent productivity is achieved, and pneumoconiosis problems tend not to occur. In addition, a toner particle diameter of 15 μm or smaller is preferred since high-resolution images are more likely to be achieved.

[Coating Materials]

When a polyester resin related to the present invention is used in a coating material, a resin solution is prepared by dissolving the polyester resin in a solvent. Namely, an embodiment of the present invention is to use a polyester resin related to the present invention as raw material for a coating material or to provide a method for producing a coating material by using a polyester resin related to the present invention.

A solvent is not limited specifically as long as it is capable of diluting a polyester resin and contributes to achieving the effects of the present invention. There are various solvents available, for example, aromatic hydrocarbons such as toluene, xylene, Solvesso #100, Solvesso #150 (made by ExxonMobil Chemical Company); aliphatic hydrocarbons such as hexane, octane and decane; esters such as methyl acetate, ethyl acetate, isopropyl acetate, butyl acetate, amyl acetate, ethyl formate, and butyl propionate, alcohols such as methanol, ethanol, propanol, butanol, 2-ethylhexanol, and ethylene glycol; ketones such as acetone, methyl ethyl ketone, methyl isobutyl ketone, and cyclohexanone; ethers such as dioxane, diethyl ether, and tetrahydrofuran; and cellosolves such as cellosolve acetate, ethyl cellosolve, butyl cellosolve and butyl carbitol.

Also, a curing agent may be added to the coating material above.

There are no restrictions to the use of any conventionally known curing agents, for example, alkyl-etherified amino-formaldehyde resins, isocyanates, blocked isocyanates and the like.

Alkyl-etherified amino-formaldehyde resins are compounds obtained by alkyl-etherifying part of or entire amino-formaldehyde resins such as urea-formaldehyde condensates, N,N-ethylene urea-formaldehyde condensates, dicyandiamide-formaldehyde condensates, and aminotriazine-formaldehyde condensates with alkylalcohols having 1~4 carbon atoms, for example, methanol, ethanol, n-propanol, isopropanol, n-butanol and the like. In particular, methoxylated methylolurea, methoxylated methylol-N,N-ethylene urea, methoxylated methylol dicyandiamide, methoxylated methylol melamine, methoxylated methylol benzoguanamine, butoxylated methylolmelamine, butoxylated methylol benzoguanamine, and the like.

As for the isocyanates, aromatic or aliphatic diisocyanates, and trivalent or higher polyisocyanates are available; for example, tetramethylene diisocyanate, hexamethylene diisocyanate, toluene diisocyanate, diphenylmethane diisocyanate, hydrogenated diphenylmethane diisocyanate, xylene diisocyanate, hydrogenated xylene diisocyanate, and isophorone diisocyanate; trimers of such isocyanates; and terminal isocyanate group-containing compounds obtained by reacting an excess amount of such an isocyanate with a low-molecular weight active hydrogen compound such as ethylene glycol, propylene glycol, trimethylolpropane, glycerine, sorbitol, ethylenediamine, monoethanolamine, diethanolamine, and triethanolamine; or with polymer active hydrogen compounds such as polyester polyols, polyether polyols, and polyamides.

Examples of blocked isocyanates are polyisocyanate compounds, which are block copolymers of the above isocyanate compounds polymerized using blocking agents such as phenols, cresols, aromatic secondary amines, tertiary alcohols, lactams, and oximes. Among them, alkyl-etherified amino-formaldehyde resins and blocked isocyanates are preferred from the viewpoint of coating stability.

When combining a polyester resin related to the present invention and a curing agent, a solid weight ratio of polyester resin to curing agent is preferred to be set at 95/5~40/60, especially preferably at 90/10~60/40, considering hardness and the ease of processing. A coating composition is diluted with the same solvent as above so that its solid concentration is adjusted. A high solid concentration may cause high viscosity and make it difficult to coat, whereas a low solid concentration may cause an insufficient film thickness during coating. Thus, a preferable solid concentration is approximately 20~70 wt %, more preferably 30~60 wt %.

In a coating composition related to the present invention, additives may be used, for example, a curing catalyst, leveling agent, ultraviolet absorber, or viscosity adjusting agent.

[For Sublimation Transfer]

When a polyester resin related to the present invention is used as a binder resin for a dye receiving layer of a sublimation transfer image receiver (hereinafter may also be referred to as "dyeable resin"), the following resins may be combined with the polyester resin related to the present invention: polyvinyl resins, polycarbonate resins, polyacrylate resins, polymethacrylate resins, polyolefin resins, cellulose derivative-based resins, polyether resins, polyester resins, and the like.

Namely, an embodiment of the present invention is to use a polyester resin related to the present invention as a binder resin for a dye receiving layer of a sublimation transfer image receiver, or to provide a method for forming a sublimation transfer image receiver using a polyester resin related to the present invention as a binder resin.

When a polyester resin related to the present invention is used as a dyeable resin, the polyester resin is preferred to be contained in the dyeable resin at 50 wt % or greater, more preferably at 80~100 wt %. When a binder resin is coated on a substrate, a polyester resin related to the present invention, along with other resins, additives or the like if applicable, is dissolved in a solvent for coating. Alternatively, after the resin is dissolved in a solvent, water is added and the solvent is removed so as to form an emulsion, which is then used as a coating material. The solid concentration of a solution or dispersion to be used for coating a substrate is conventionally at 5~70 wt %. Examples of a substrate are paper, synthetic paper, various types of film, various sheets and the like. The thickness of a substrate is preferred to be 20~200 μm, and the thickness of a coating layer is preferred to be 0.1~50 μm.

A polyester resin related to the present invention may also be used in an image protection layer. In the present invention, a sublimation transfer receiver refers to a recording material to produce an image by transferring a sublimation dye to a coating layer. A coating layer is where images are formed by transferring sublimation dyes. An image protection layer is a transparent or semi-transparent layer formed on a coating layer to protect the image on the coating layer from contamination, light or the like.

The resin used for an image protection layer in the present invention is diluted by the above-mentioned solvent or the like so that an optimum solution viscosity is obtained while coating on a substrate. To further enhance protection capability, a polyester resin related to the present invention may be thermoset or crosslinked. Examples of a curing agent for a thermosetting process are silicone resins, melamine resins, phenol-formalin resins, epoxy resins, isocyanate resins and the like. In addition, types of crosslinking are ion crosslinking, radiation crosslinking, radical crosslinking and the like.

Examples of resins to be combined with a polyester resin related to the present invention are polyvinyl resins, polycarbonate resins, polyacrylic resins, polyester resins, polymethacrylate resins, polyolefin resins, cellulose derivative-based resins, polyether resins, vinyl chloride resins, polyurethane resins, polyamide resins, epoxy resins, polyacetal resins, polystyrene resins, and modified resins thereof. Moreover, inorganic or organic oil powders may be mixed in or added to the resin; for example, paraffin wax, microcrystalline wax, carnauba wax, beeswax, chlorinated paraffin petroleum resins, low-molecular weight polyethylene, linseed oil, mineral oils and the like.

Among the resins for forming an image protection layer, a polyester resin related to the present invention is preferred to be contained at 1 wt % or greater, more preferably at 5~100 wt %.

The thickness of an image protection layer is not limited specifically as long the effects of the present invention are achieved, but usually, it is approximately 0.01~20 μm.

The substrate of a protection film for a sublimation transfer receiver is preferred to be heat tolerant; for example, paper, synthetic paper, various types of film, various sheets and the like may be used. Examples are plastic films such as polyester, polycarbonate, polyarylate polyethersulfone, polyimide, polyamide, polyamideimide, and polyfluoroethylene, or synthetic papers made from those materials. They may be laminated to form a substrate. The thickness of a substrate is 5~10 μm, preferably 8~50 μm.

To form a protection film for a sublimation transfer receiver by coating a resin for an image protection layer on a heat-tolerant substrate, a polyester resin related to the present invention, along with other resins, additives or the like if applicable, is dissolved in a solvent and coated, or the polyester resin is formed into an emulsion by adding water to a resin-dissolved solvent and then by removing the solvent.

The solid concentration of a solution or a dispersion to be used for coating on a substrate is usually set at approximately 1~70 wt %.

On a protection film for a sublimation transfer receiver formed by using a polyester resin related to the present invention, a release layer containing silicone resin, fluorine resin, wax or the like may be provided between the heat-tolerant substrate and an image protection layer.

An adhesive layer may also be formed on an image protection layer to enhance adhesiveness with the receiver layer. Moreover, on a side of a substrate opposite where an image protection layer is formed, a heat-tolerant backcoat layer containing thermosetting or photocurable resin may also be formed. Examples of a release layer, adhesive layer, and heat-tolerant backcoat layer are those used in a hot-melt transfer ink ribbon or sheet, sublimation thermal transfer ribbon or sheet or the like.

EXAMPLES

Examples of the present invention are described below. Evaluation was conducted as follows.
(1) Evaluation Method of Polyester Resin
<Glass Transition Temperature (Tg)>

A glass transition temperature was measured by using a differential scanning calorimeter (DSC-60, made by Shimadzu Corporation) and obtained as the value at the intersection of the baseline and the tangent of endothermic curve in a chart prepared by setting the rate of temperature rise at 5° C./min. In an aluminum pan, 10 mg±0.5 mg of a sample was measured, and melted for 10 minutes at a temperature (100° C.) higher than its glass transition temperature. Then, the sample was cooled using dry ice.
<Softening Temperature (T4)>

A softening temperature was measured using a flow tester (CFT-500D, made by Shimadzu) when a 4 mm-long amount is flowed out of 1.0 gram of a resin sample through a 1 mmϕ×10 mm nozzle under conditions of a load at 294 N, and a programmed temperature rise of 3° C./min.
<Acid Value>

Approximately 0.2 grams of a sample was accurately weighed in a branched Erlenmeyer flask (A grams), 10 mL of benzyl alcohol was added, and heat was applied to a resin for 15 minutes by a 230° C. heater to melt the resin under a nitrogen atmosphere. After the resin was cooled to room temperature, 10 mL of benzyl alcohol, 20 mL of chloroform and a few drops of a cresol red solution were added. The acid value of the resin was determined by using 0.02N KOH solution (titration volume=B (mL), strength of KOH solution=p). A blank measurement was also conducted (titration volume=C (mL)), and the acid value was measured based on the following formula.

$$\text{Acid value (mg KOH/g)} = (B-C) \times 0.02 \times 56.11 \times p \div A$$

<Molecular Weight: Peak Molecular Weight (Mp), Mass-Average Molecular Weight (Mw), Number-Average Molecular Weight (Mn)>

GPC was conducted, and the peak molecular weight (Mp) in terms of standard styrene was determined from the retaining time corresponding to the peak value in the obtained elution curve. The peak value of an elution curve is the value at the relative maximum point of the elution curve. When there are two or more relative maximum values, the peak value is where the elution curve is the maximum.

Device: HLC8020, made by Tosoh Corporation
Column: three in-line columns, TSKgelGMHXL, made by Tosoh Corporation (column Size: 7.8 mm (ID)×30.0 cm (L))
Oven temperature: 40° C.
Eluent: THF
Sample concentration: 20 mg/10 mL
Filtration condition: sample solution was filtrated by a 0.45 μm Teflon® membrane filter
Flow rate: 1 mL/min
Injection amount: 0.1 ml
Detector: RI
Standard polystyrene samples for forming a calibration curve: TSK standard made by Tosoh Corporation, A-500 (molecular weight $5.0 \times 10^2$), A-2500 (molecular weight $2.74 \times 10^3$), F-2 (molecular weight $1.96 \times 10^4$), F-20 (molecular weight $1.9 \times 10^5$), F-40 (molecular weight $3.55 \times 10^5$), F-80 (molecular weight $7.06 \times 10^5$), F-128 (molecular weight $1.09 \times 10^6$), F-288 (molecular weight $2.89 \times 10^6$), F-700 (molecular weight $6.77 \times 10^6$), F-2000 (molecular weight $2.0 \times 10^7$).

<Analysis of Resin Composition of Polyester Resin>

The resin composition of the polyester resin was analyzed under the following conditions using a superconducting nuclear magnetic resonance apparatus.

Device: Excalibur 270 superconducting FT-NMR, made by JEOL Ltd.
Magnet: JNM-GSX 270 super conducting magnet
Spectrometer: JNM-EX270
Observation frequency: $^1$H: 270 MHz, $^{13}$C: 67 MHz
Solvent: deuterochloroform solution
Temperature: 35° C.
Number of integrations: $^1$H: 16 times, $^{13}$C: 1024 times $^1$H-NMR and $^{13}$C-NMR were analyzed, and the percentages of polycarboxylic acid and polyalcohol were determined from the integrated intensity ratio of each peak assigned to structural units.

<Solubility in Ester-Based Solvent>

Insoluble Content of Methyl Ethyl Ketone (MEK)

Approximately 0.5 grams of polyester resin was accurately weighed (A grams) in an Erlenmeyer flask, and 50 mL of MEK was added to the flask. The flask was then placed in a 70° C. water bath for 3 hours to hot-melt the mixture. The solution was subjected to suction filtration using a 1 GP-100 glass filter prepared by tightly packing Celite 545 and then fully drying the Celite 545 (B grams). Then, residual MEK in the glass filter was fully removed by using acetone, and the glass filter with residual insoluble content was dried again and measured (C grams). The MEK insoluble content was calculated by the following formula.

$$\text{MEK insoluble content (mass \%)} = (C-B)/A \times 100$$

The evaluation standard of insolubility in an ester-based solvent was set as follows:

S (remarkably good): MEK insoluble content is 0~1 mass %.
A (good): MEK insoluble content is 2~3 mass %.
B (usable): MEK insoluble content is 4~5 mass %.
C (poor): MEK insoluble content is 6 mass % or greater.

<Solubility in Aromatic Solvent>

Insoluble Content of Toluene

Approximately 0.5 grams of polyester resin was accurately weighed (A grams) in an Erlenmeyer flask, and 50 mL of toluene was added to the flask, which was then placed in a 70° C. water bath for 3 hours to hot-melt the mixture. The solution was subjected to suction filtration using a 1 GP-100 glass filter prepared by tightly packing Celite 545 and then fully drying the Celite 545 (B grams). Then, residual toluene in the glass filter was fully removed by using acetone, and the glass filter with residual insoluble content was dried again and measured (C grams). The toluene insoluble content was calculated by the following formula.

$$\text{toluene insoluble content (mass \%)} = (C-B)/A \times 100$$

The evaluation standard of solubility in an aromatic solvent was set as follows:

S (remarkably good): toluene insoluble content is 0~1 mass %.
A (good): toluene insoluble content is 2~3 mass %.
B (usable): toluene insoluble content is 4~5 mass %.
C (poor): toluene insoluble content is 6 mass % or greater.

<Pulverization Property>

The pulverization property for fine-particle formation was evaluated by determining the residual rate of resin remaining on a mesh. Here, the residual rate is the value obtained as follows: the resin after a regular pulverization process was sifted to obtain powdered resin that passes through a 16 mesh screen but is unable to pass through a 22 mesh screen. The sorted resin powder is accurately weighed to be 10.00 grams, which is then pulverized for 10 seconds using a pulverization device (Trio Blender, made by Trio Science Co.) and filtered through a 30 mesh screen. The weight (A) grams of resin that did not pass is accurately measured, and a residual amount is calculated from the value (A). The procedure is repeated three times, and an average value is obtained. The residual rate is calculated as follows.

$$\{(A) \text{ g/resin weight before pulverization } (10.00 \text{ g})\} \times 100 = \text{resin residual rate (\%)}$$

From the resin residual rate, the pulverization property was evaluated as follows:

S (remarkably good): resin residual rate is less than 55%.
A (good): resin residual rate is 55% or greater but less than 70%.
B (usable): resin residual rate is 70% or greater but less than 85%.
C (poor): resin residual rate is 85% or greater.

<Storage Stability>

Approximately 5 grams of a toner was put into a sample bottle, which was left in a drier heated at a constant temperature of 65° C. for about 24 hours. The degree of agglomeration of the toner was evaluated and set as an index for storage stability. The evaluation standard of storage stability was set as follows:

S (remarkably good): the toner is dispersed by simply turning the sample bottle upside down.
A (good): the toner is dispersed when the bottle is turned upside down and hit 1~3 times.

C (poor): the toner is dispersed when the bottle is turned upside down and hit 4 or more times.

Example 1

(Synthesizing Compound Represented by General Formula (2))

A compound (erythritane) represented by general formula (2) was synthesized as follows and used as a monomer of a polyester resin. The compound was analyzed through gas chromatography (column: DB-5, made by J&B Scientific Co., Ltd., 30 m long×0.53 mm inner dia., film thickness: 3 μm, injection temperature: 200° C., detector temperature: 250° C., column temperature and time: kept for 1 minute at 60° C., temperature raised at 10° C./min, kept at 250° C.).

In a 300 mL four-neck flask equipped with a Claisen tube wrapped with insulation material and a thermometer, 14.0 grams (1.75 mol) of erythritol and 21 grams (0.18 mol) of 85% phosphoric acid were prepared. Then, a Liebig condenser, thermometer, bifurcated adapter, flask, trap set to prevent blockage by frozen water, vacuum pump, and pressure regulator were connected. The flask was heated in an oil bath while the solution was stirred using a magnetic stirrer. When the inner temperature reached 135° C., a reduction of pressure was initiated by turning on the vacuum pump, and the pressure was gradually reduced. A solution containing the produced erythritane was condensed using the Liebig condenser and collected in a flask.

When 65 mL of the solution containing erythritane was collected, the vacuum pump was temporarily turned off, and 72.5 grams (0.59 mol) of erythritol was fed into the four-neck flask, the vacuum pump was turned on again and the collection of erythritane was resumed. After that, the same procedure was repeated 13 times to feed erythritol, and the reactions were continued until no erythritane flowed out. The total amount of erythritol was 1229.0 grams (10.1 mol). The temperature of the reaction solution was 135~145° C., and the final pressure was 150 Pa.

The purity of collected erythritane was analyzed through gas chromatography. The amount of collected solution containing erythritane was 1001.7 grams, the purity was 96%, and the yield was 92%.

(Producing Polyester Resin)

Next, polymerization reactions were carried out to produce polyester resin.

Using the amount of each component specified in Table 1, a monomer mixture was prepared to contain polycarboxylic acid, polyalcohol, and tetra-n-butoxytitanium at 1000 ppm relative to polycarboxylic acid; the monomer mixture was then fed into a reaction vessel equipped with a distillation column. Then, the monomer mixture was heated until the temperature of the reaction system reached 265° C. While the temperature was maintained, esterification reactions were continued until no water was distilled from the reaction system.

Next, the temperature in the reaction system was lowered to 235° C. and the pressure in the reaction vessel was reduced to perform condensation reactions while polyalcohol was distilled from the system.

To determine when to finish polymerization, approximately 2 grams of resin was sampled during polycondensation reactions to measure its (Tg), and when the (Tg) of the sample reached a predetermined (Tg) shown in Table 1, polymerization was terminated.

The reaction product was promptly cooled using a belt cooler to a temperature lower than (Tg) and taken out of the vessel. Accordingly, polyester resin (resin 1) was obtained. The prepared component ratio of resin 1 and the resin composition are shown in Table 1.

Also, evaluation results of physical property values, solubility in an ester solvent, solubility in an aromatic solvent, and pulverization property of resin 1 are shown in Table 2. In Table 2, resin composition means the composition ratio of resin 1 analyzed by the aforementioned super conducting NMR apparatus.

(Producing Toner)

Next, 93 mass parts of resin 1, 3 mass parts of quinacridone pigment (E02, made by Clariant) as a colorant, 1 mass part of a negative charge control agent LR-147 (made by Japan Cartlit Co., Ltd.), and 3 mass parts of carnauba wax (made by Toyo Petrolite Co., Ltd.) were combined to form a powder mixture. Then, the powder mixture was melt-kneaded by a twin-screw extruder (PCM-29, made by Ikegai Tekko K.K.) at an external temperature of 120° C. and duration in the extruder for 1 minute. After being roughly pulverized, the powder was finely pulverized by a jet-mill pulverizer and screened to obtain a fine powder with an average diameter of 5 μm. The fine-powder toner without any external additive was used to evaluate the storage stability of the toner Evaluation results are shown in Table 2.

Examples 2~10, Comparative Examples 1~2

Each polyester resin was prepared the same as in Example 1 except that the erythritane produced in Example 1 was used, polycarboxylic acid and polyalcohol were prepared to have the component ratio shown in Table 1, and tetra-n-butoxytitanium was added at 1000 ppm relative to the total amount of polycarboxylic acid. The characteristic values of polyester resins (resins 2~12) are shown in Table 1. Also, toners were produced the same as in Example 1 except that resins 2~12 were used respectively. The composition ratio of each resin is shown in Table 1, and physical property values and performance evaluation results are shown in Table 2.

TABLE 1

| | | | Example 1 Resin 1 | Example 2 Resin 2 | Example 3 Resin 3 | Example 4 Resin 4 | Example 5 Resin 5 | Example 6 Resin 6 |
|---|---|---|---|---|---|---|---|---|
| Prepared Component Ratio | polycarboxylic acid (molar parts) | terephthalic acid | 60 | 60 | 60 | 60 | 60 | 90 |
| | | isophthalic acid | 34 | 30 | 40 | 40 | 34 | |
| | | adipic acid | | 4 | | | | |
| | | trimellitic acid | 6 | 6 | | | 6 | |
| | | fumaric acid | | | | | | 10 |
| | polyalcohol (molar parts) | ethylene glycol | 35 | 15 | 20 | 13 | 35 | 50 |
| | | bisphenol A propylene oxide (2.3 mol) adduct | 45 | 45 | 45 | 30 | 45 | |

TABLE 1-continued

| | | | | | | | | |
|---|---|---|---|---|---|---|---|---|
| | | erythritane | 40 | 60 | 40 | 65 | 40 | 5 |
| | | bisphenol A ethylene oxide (2.0 mol) adduct | | | | | | 50 |
| | | trimethylolpropane | | | | 5 | 2 | |
| Resin Composition | polycarboxylic acid (molar parts) | terephthalic acid | 60 | 60 | 60 | 60 | 60 | 90 |
| | | isophthalic acid | 34 | 30 | 40 | 40 | 34 | |
| | | adipic acid | | 4 | | | | |
| | | trimellitic acid | 6 | 6 | | | 6 | |
| | | fumaric acid | | | | | | 8 |
| | polyalcohol (molar parts) | ethylene glycol | 29 | 3 | 4 | 8 | 33 | 34 |
| | | bisphenol A propylene oxide (2.3 mol) adduct | 45 | 44 | 45 | 29 | 45 | |
| | | erythritane | 40 | 57 | 38 | 62 | 40 | 3 |
| | | bisphenol A ethylene oxide (2.0 mol) adduct | | | | | | 53 |
| | | trimethylolpropane | | | | 5 | 2 | |

| | | | Example 7 Resin 7 | Example 8 Resin 8 | Example 9 Resin 9 | Example 10 Resin 10 | Comp. Example 1 Resin 11 | Comp. Example 2 Resin 12 |
|---|---|---|---|---|---|---|---|---|
| Prepared Component Ratio | polycarboxylic acid (molar parts) | terephthalic acid | 100 | 100 | 90 | 90 | 60 | 60 |
| | | isophthalic acid | | | | | 34 | 34 |
| | | adipic acid | | | | | | |
| | | trimellitic acid | | | | | 6 | 6 |
| | | fumaric acid | | | 10 | 10 | | |
| | polyalcohol (molar parts) | ethylene glycol | 35 | 35 | 15 | 35 | 68 | 65 |
| | | bisphenol A propylene oxide (2.3 mol) adduct | | | | 50 | 45 | 15 |
| | | erythritane | 20 | 20 | 40 | 20 | | 40 |
| | | bisphenol A ethylene oxide (2.0 mol) adduct | 50 | 50 | 50 | | | |
| | | trimethylolpropane | | | | | | |
| Resin Composition | polycarboxylic acid (molar parts) | terephthalic acid | 100 | 100 | 90 | 90 | 60 | 60 |
| | | isophthalic acid | | | | | 34 | 34 |
| | | adipic acid | | | | | | |
| | | trimellitic acid | | | | | 5 | 6 |
| | | fumaric acid | | | 8 | 8 | | |
| | polyalcohol (molar parts) | ethylene glycol | 29 | 33 | 11 | 31 | 63 | 48 |
| | | bisphenol A propylene oxide (2.3 mol) adduct | | | | 51 | 45 | 15 |
| | | erythritane | 15 | 17 | 35 | 16 | | 38 |
| | | bisphenol A ethylene oxide (2.0 mol) adduct | 51 | 52 | 52 | | | |
| | | trimethylolpropane | | | | | | |

TABLE 2

| | | | Example 1 Resin 1 | Example 2 Resin 2 | Example 3 Resin 3 | Example 4 Resin 4 | Example 5 Resin 5 | Example 6 Resin 6 |
|---|---|---|---|---|---|---|---|---|
| Physical Properties of Resin | | glass transition temp. (Tg) [° C.] | 81 | 82 | 83 | 94 | 72 | 65 |
| | | softening temp. (T4) [° C.] | 137 | 134 | 137 | 146 | 123 | 121 |
| | | acid value [mg KOH/g] | 4 | 10 | 9 | 14 | 10 | 12 |
| | | number-average molecular weight (Mn) | 3200 | 1800 | 2700 | 2100 | 2100 | 3100 |
| | | mass-average molecular weight (Mw) | 16000 | 7300 | 11200 | 6200 | 9100 | 11300 |
| | | peak molecular weight (Mp) | 6200 | 3900 | 4800 | 4000 | 4300 | 8500 |
| Characteristics | solubility in ester solvent | MEK insoluble content [wt %] | 0 | 0 | 0 | 0 | 0 | 0 |
| | | evaluation | A | A | A | A | A | A |
| | solubility in aromatic solvent | toluene insoluble content [wt %] | 0 | 0 | 0 | 0 | 0 | 0 |
| | | evaluation | A | A | A | A | A | A |
| | pulverization property | resin residual rate [wt %] | 68 | 50 | 45 | 53 | 50 | 80 |
| | | evaluation | A | S | S | S | S | B |
| | storage stability of toner | number of times | 1 | 1 | 1 | 1 | 1 | 1 |
| | | evaluation | A | A | A | A | A | A |

TABLE 2-continued

| | | Example 7 Resin 7 | Example 8 Resin 8 | Example 9 Resin 9 | Example 10 Resin 10 | Comp. Example 1 Resin 11 | Comp. Example 2 Resin 12 |
|---|---|---|---|---|---|---|---|
| Physical Properties of Resin | glass transition temp. (Tg) [° C.] | 68 | 53 | 73 | 70 | 68 | 82 |
| | softening temp. (T4) [° C.] | 117 | 103 | 125 | 121 | 128 | 138 |
| | acid value [mg KOH/g] | 19 | 30 | 19 | 25 | 12 | 6 |
| | number-average molecular weight (Mn) | 2100 | 1400 | 2200 | 1700 | 3700 | 2800 |
| | mass-average molecular weight (Mw) | 6900 | 4100 | 8600 | 6700 | 23800 | 12500 |
| | peak molecular weight (Mp) | 5600 | 3400 | 5600 | 3900 | 13100 | 5700 |
| Characteristics | solubility in ester solvent MEK insoluble content [wt %] | 0 | 0 | 0 | 0 | 4 | 0 |
| | evaluation | A | A | A | A | B | A |
| | solubility in aromatic solvent toluene insoluble content [wt %] | 0 | 0 | 0 | 0 | 0 | 8 |
| | evaluation | A | A | A | A | A | C |
| | pulverization property resin residual rate [wt %] | 56 | 35 | 55 | 45 | 92 | 55 |
| | evaluation | S | S | S | S | C | A |
| | storage stability of toner number of times | 1 | 3 | 1 | 1 | 1 | 1 |
| | evaluation | A | B | A | A | A | A |

Since the polyester resin prepared for Comparative Example 1 does not include a structural unit represented by general formula (1), properties of the polyester resin exhibited were insufficient; that is, solubility in an ester-based solvent, pulverization into fine particles and storage stability of the toner were low.

In the polyester resin prepared for Comparative Example 2, the ratio of the structural unit derived from a compound having a bisphenol skeleton is less than 20 molar parts relative to 100 molar parts of the structural unit derived from polycarboxylic acid. Accordingly, the solubility of the polyester resin in an aromatic solvent was insufficient.

INDUSTRIAL APPLICABILITY

The polyester resin related to the present invention exhibits all the necessary properties, namely, solubility in solvents, pulverization into fine particles, and storage stability of a toner to be produced. Thus, the polyester resin is suitable for use as a material to produce a toner by either of pulverization and chemical methods.

The invention claimed is:

1. A polyester resin, comprising:
a structural unit of formula (1);
a structural unit derived from a compound having a bisphenol skeleton; and
a structural unit derived from polycarboxylic acid,
wherein the structural unit derived from a compound having a bisphenol skeleton is contained at 20 molar parts or greater relative to 100 molar parts of the structural unit derived from polycarboxylic acid

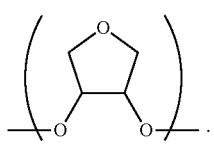

(1)

2. The polyester resin according to claim 1, wherein the structural unit derived from a compound having a bisphenol skeleton is derived from bisphenol A propylene oxide adduct.

3. The polyester resin according to claim 1, wherein the structural unit of formula (1) is contained at 5 to 75 molar parts relative to 100 molar parts of the structural unit derived from polycarboxylic acid.

4. The polyester resin according to claim 1, comprising a structural unit derived from a monomer having at least three functional groups, wherein the structural unit derived from a monomer having at least three functional groups is contained at 1 to 30 molar parts relative to 100 molar parts of the structural unit derived from polycarboxylic acid.

5. The polyester resin according to claim 4, wherein the structural unit derived from a monomer having at least three functional groups is derived from trimellitic acid or its anhydride.

6. The polyester resin according to claim 1, wherein a glass transition temperature (Tg) is set at 45 to 100° C.

7. The polyester resin according to claim 1, wherein a peak molecular weight (Mp) measured by gel permeation chromatography (GPC) is 500 to 50,000.

8. The polyester resin according to claim 1, wherein a softening temperature is set at 100 to 160° C.

9. A method for producing the polyester resin according to claim 1, comprising:
polycondensing a monomer mixture comprising a polyalcohol of formula (2), a compound having a bisphenol skeleton, and polycarboxylic acid,
wherein a content of the compound having a bisphenol skeleton in the monomer mixture is 20 molar parts or greater relative to 100 molar parts of the polycarboxylic acid

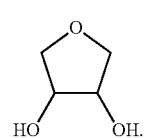

(2)

10. The method for producing a polyester resin according to claim 9, wherein the compound having a bisphenol skeleton is bisphenol A propylene oxide adduct.

11. The method for producing a polyester resin according to claim 9, wherein a content of polyalcohol of formula (2) in the monomer mixture is set at 15 to 75 molar parts relative to 100 molar parts of the polycarboxylic acid.

12. The method for producing a polyester resin according to claim 9, wherein the monomer mixture comprises a monomer having at least three functional groups, and a content of the monomer having at least three functional groups in the monomer mixture is 1 to 30 molar parts relative to 100 molar parts of the polycarboxylic acid.

13. The method for producing a polyester resin according to claim 9, wherein the monomer having at least three functional groups is trimellitic acid or its anhydride.

14. The method for producing a polyester resin according to claim 9, wherein the temperature for polycondensing the monomer mixture is 180 to 280° C.

15. The method for producing a polyester resin according to claim 9, wherein the monomer mixture comprises a release agent.

16. A toner, comprising the polyester resin according to claim 1.

* * * * *